(12) United States Patent
Nakano et al.

(10) Patent No.: US 8,612,969 B2
(45) Date of Patent: *Dec. 17, 2013

(54) ELECTRONIC DEVICE

(75) Inventors: Shuichi Nakano, Matsumoto (JP);
Minoru Takizawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 33 days.

This patent is subject to a terminal disclaimer.

(21) Appl. No.: 13/307,583

(22) Filed: Nov. 30, 2011

(65) Prior Publication Data

US 2012/0089975 A1    Apr. 12, 2012

Related U.S. Application Data

(63) Continuation of application No. 11/583,297, filed on Oct. 18, 2006, now Pat. No. 8,091,083.

(30) Foreign Application Priority Data

Oct. 18, 2005    (JP) .................. 2005-303415

(51) Int. Cl.
*G06F 9/44*    (2006.01)
(52) U.S. Cl.
USPC ........... 717/178; 717/127; 717/168; 717/174; 714/4.3; 714/43
(58) Field of Classification Search
USPC .............. 717/168–178; 714/4.3, 43
See application file for complete search history.

(56) References Cited

U.S. PATENT DOCUMENTS

| | | | | |
|---|---|---|---|---|
| 5,209,560 A * | 5/1993 | Taylor et al. | | 362/85 |
| 5,809,251 A * | 9/1998 | May et al. | | 709/223 |
| 5,940,074 A * | 8/1999 | Britt et al. | | 715/749 |
| 6,023,268 A * | 2/2000 | Britt et al. | | 709/203 |
| 6,230,319 B1 * | 5/2001 | Britt et al. | | 717/173 |
| 6,259,442 B1 * | 7/2001 | Britt et al. | | 715/721 |
| 6,341,239 B1 * | 1/2002 | Hayashi et al. | | 700/79 |
| 6,473,099 B1 * | 10/2002 | Goldman et al. | | 715/749 |
| 7,308,552 B2 * | 12/2007 | Hori | | 711/211 |
| 7,523,399 B2 * | 4/2009 | Britt et al. | | 715/748 |
| 2002/0066092 A1 * | 5/2002 | Liu | | 717/168 |
| 2004/0054907 A1 * | 3/2004 | Chateau et al. | | 713/175 |

FOREIGN PATENT DOCUMENTS

| | | |
|---|---|---|
| JP | 9-114614 A | 5/1997 |
| JP | 10-083358 | 3/1998 |
| JP | 10-198571 | 7/1998 |
| JP | 3572861 | 10/1998 |
| JP | 2002-366362 | 12/2002 |
| JP | 2003-242013 | 8/2003 |
| JP | 2005-025238 | 1/2005 |

* cited by examiner

*Primary Examiner* — Wei Zhen
*Assistant Examiner* — Satish Rampuria
(74) *Attorney, Agent, or Firm* — Nutter McClennen & Fish LLP; John J. Penny, Jr.; Michael P. Visconti, III

(57) ABSTRACT

An electronic apparatus is provided that can include a first downloader downloading a replacement control program from an external host computer by way of a first communicator under the control of a first communication program, in a case where a first inspector judges a control program is not normal and a second inspector judges the first communication program is normal. The apparatus can also include a second downloader downloading a replacement first communication program from an external maintenance computer by way of a second communicator under the control of a second communication program, in a case where a second inspector judges the first communication program is not normal, so that a first communication program stored in a rewritable flash ROM is rewritten with the replacement first communication program downloaded by the second downloader.

1 Claim, 4 Drawing Sheets

ELECTRONIC DEVICE

CROSS-REFERENCE TO RELATED APPLICATIONS

This application is a continuation of U.S. patent application Ser. No. 11/583,297, entitled "Electronic Apparatus Configured To Replace An Abnormal Program With A Downloaded Replacement Program," filed Oct. 18, 2006 now U.S. Pat. No. 8,091,083. Priority under 35 U.S.C. §120 is claimed to this application, and the entire contents of the application are incorporated herein by reference. This application also claims priority under 35 U.S.C. §119 to Japanese Patent Application No. JP 2005-303415, filed in Japan on Oct. 18, 2005 the entire contents of which are incorporated herein by reference.

BACKGROUND

1. Technical Field

The present invention relates to an electronic device such as a printer and, more particularly, to an electronic device to be controlled on the basis of the operations of a control program (or a firmware program), and to an electronic device having a downloading function of the control program.

2. Related Art

In the conventional electronic device such as an ink Jet type printer, an actuator such as a sheet feeding motor or a recording head is controlled in its drive by executing a print control program (or a firmware program). In the electronic device of this kind, the specifications are frequently updated (or upgraded). With a view to giving a specific function of the user's need to the printer, the firmware program is often written in a nonvolatile memory so that an update to overwrite the firmware program of a new version In the nonvolatile memory is performed at the time of updating the specifications as disclosed in Japanese Patent Publication No. 9-114614A (JP-A-9-114614), for example. In the nonvolatile memory, however, the program is erroneously erased or not rewritten at its portion when it is rewritten, so that the data such as the program is more frequently broken than the nonrewritable memory (or the read only memory) such as a mask ROM. When this abnormal program is executed to drive and control the actuator or the like, the electronic device may be left inactive, or its trouble may be induced, as the case may be, by an abnormal operation.

In Japanese Patent No. 3572861, for example, there is disclosed a method, in which a program inspecting function is provided to perform an inspection at an initial operation time so that the print control program is downloaded and updated in a case where the inspection discovers an abnormal state. According to this method, in a case where the abnormal state is discovered as the result of the inspection of the print control program, the print control program is downloaded from a host computer. In order to give the electronic device the download function, the memory has to be stored with a communication program for enabling the electronic device to communicate with the communicator of the host computer of a download source.

In a case where the downloading communication program fails, however, there arises a problem that the print control program cannot be updated.

Moreover, there is also conceived a configuration. In this configuration, in order that the download may be performed even in a case where the communication program fails, another program is stored with another communication program (or a second communication program), which can download the firmware program and the communication program. However, the communication program to perform communications by using the USB interface which is recently coming mainstream of the communication method between the printer and the host computer adopts the communication protocol, in which the USB communication method matches one-to-many communications so that it has a relatively large program data capacity. In other words, the USB communication method needs exchanges requesting the printer much intrinsic information so that the host computer may recognize the printer or its communication party. Therefore, the intrinsic information data or many processing procedures have to be contained in the program so that the data capacity of the communication program is liable to become relatively massive. The addition of this communication program occupies the wide recording area of another memory. As a result, there are invited situations requiring the treatments that the addition of another program to another memory is abandoned, that another memory is replaced by one having a larger storage capacity and a higher price, and that still another memory is added.

SUMMARY

It is therefore one advantageous aspect of the invention is to provide an electronic device which can download a control program even in a case where the control program is faulty and in a case where a communication program is also faulty.

According to one aspect of the invention, there is provided an electronic apparatus, comprising:

a communicator, adapted to perform communications with an external apparatus;

a rewritable memory, storing a control program configured to control an operation of the electronic apparatus, and a first communication program:

an unrewritable memory, storing a second communication program;

a first inspector, operable to judge whether the control program is normal;

a second inspector, operable to judge whether the first communication program is normal;

a first downloader, operable to download the control program from the external apparatus by way of the communicator under the control of the first communication program, in a case where the first inspector judges the control program is not normal and the second inspector judges the first communication program is normal; and a second downloader, operable to download at least one of the control program and the first communication program from the external apparatus by way of the communicator under the control of the second communication program, in a case where the first inspector judges the control program is not normal and the second inspector judges the first communication program is not normal.

According to one aspect of the invention, there is provided an electronic apparatus, comprising:

a communicator, adapted to perform communications with an external apparatus;

a first storage region, storing a control program configured to control an operation of the electronic apparatus, and a first communication program;

a second storage region, storing a second communication program;

a first inspector, operable to judge whether the control program is normal;

a second inspector, operable to judge whether the first communication program is normal;

a downloader, operable to download the control program from the external apparatus by way of the communicator under the control of the first communication program, in a case where the first inspector judges the control program is not normal and the second inspector judges the first communication program is normal, and operable to download the first communication program from the external apparatus by way of the communicator under the control of the second communication program, in a case where the second inspector judges the first communication program is not normal.

DETAILED DESCRIPTION OF THE EXEMPLARY EMBODIMENTS

Exemplary embodiments of the invention will be described below in detail with reference to the accompanying drawings.

Figure 1:
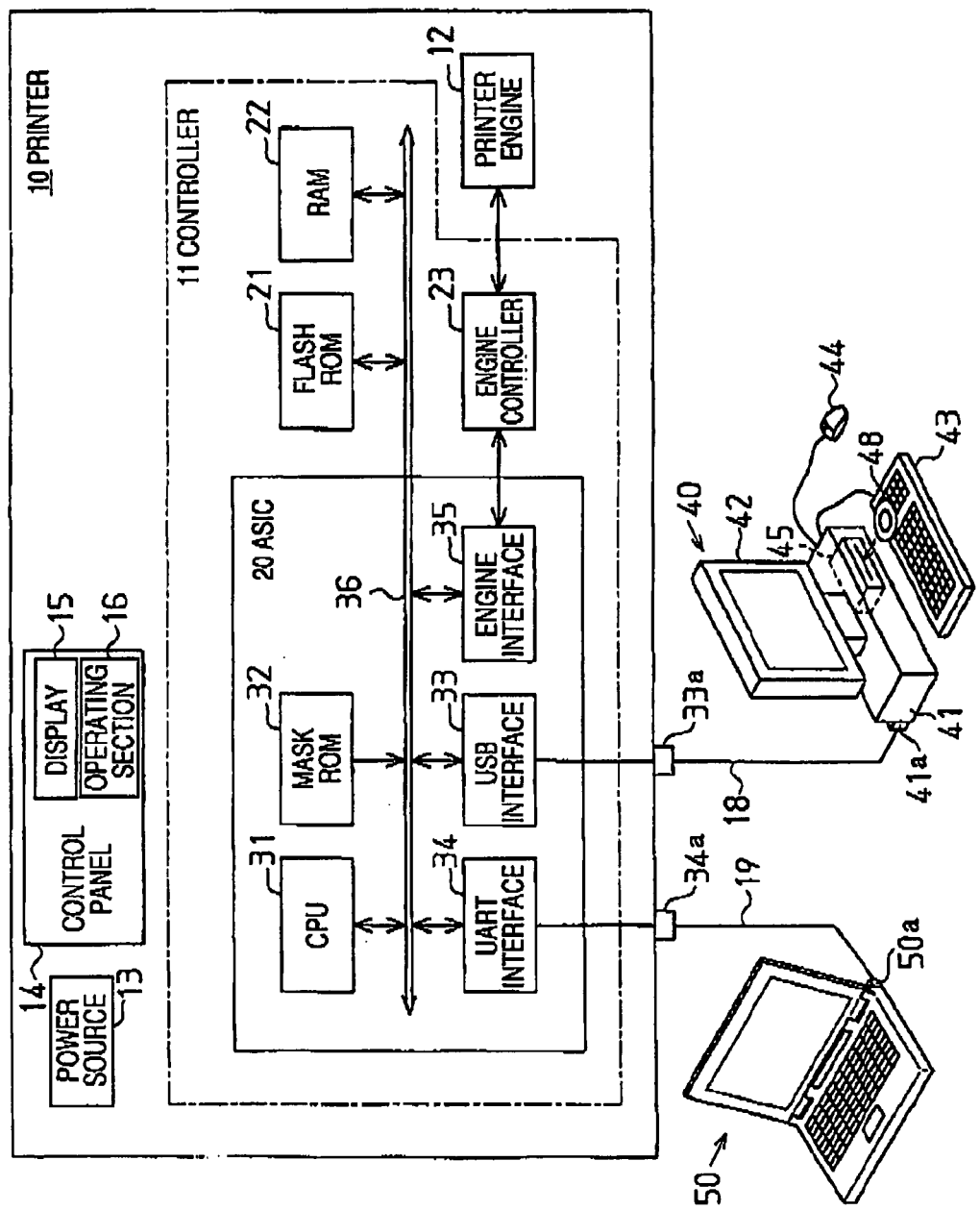
FIG. 1 is a block diagram showing an electric configuration of a printer according to one aspect of the invention.

FIG. 1 shows an electric configuration of an electronic device system (or a printer system) according to one embodiment of the invention. The printer system is provided with a host computer 40 and a maintenance computer 50. The printer 10 performs printing operations on the basis of print data set from the host computer 40. Moreover, the printer 10 has a function to download a print control program (or a firmware program) from the host computer 40. The maintenance computer 50 is a computer for downloading, in a case where the download from the host computer 40 becomes impossible, to the printer 10 through a communication terminal, which is different from the communication terminal (or the USB terminal) used by the host computer 40 for sending the print data. Both the host computer 40 and the maintenance computer 50 are personal computers (PC), and the maintenance computer 50 is exemplified by a portable type note PC so that it may be easily carried by a serviceman to perform the downloading operations, for example.

The printer 10 is provided with a printer controller 11, a printer engine 12, a power source 13, a control panel 14, and so on. The control panel 14 (or the operation panel) is provided with a display 15 for displaying various print menus, printing condition information (e.g., a sheet size or a print mode) and so on, and an operating section 16 to be used for operations to input a prescribed command, set information and so on to the printer 10. The operating section 16 is configured to include a power switch, a print start switch, a maintenance switch, a select switch for selecting the various menus and the set information displayed in the display 15, an enter switch to determine the contents selected, and so on.

The printer engine 12 is configured to include an actuator or the like disposed in the printer 10 so as to executing the printing operations. The actuator is constituted to include a recording head for injecting (or ejecting) ink for the printing operations, a carriage motor for reciprocating the carriage carrying the recording head, in a primary scanning direction, a sheet feeding motor for driving conveyance rollers to convey a printing sheet as a recording medium in a secondary scanning direction thereby to feed, convey and eject the printing sheet. In this embodiment, the driving members belonging to the printer 10, namely, the actuators and the control panel 14 is wholly driven and controlled by executing the firmware program.

On the other hand, the power source has an AC-DC converter or the like built therein for dropping/rectifying the AC voltage (e.g., 100 V) of the home-use AC power source thereby to convert it into the DC voltage to be used in the printer 10. The power source 13 generates a DC voltage to be outputted, such as the voltage (e.g., 42 V) for the power supply system to be used for driving the actuators, the voltage (e.g., 5 V) for the operation panel system, and the voltage (e.g., 3.3 V) for the control system (or the logic system).

The printer controller 11 controls the printer 10 overall. For example, the printer controller 11 controls not only the drive of the printer engine 12 but also the communications to be performed with the host computer 40 for receiving the various data such as the print data necessary for the printing operations and the various commands, and the communications for the later-described program downloads. In addition, the printer controller 11 performs the controls of the power source 13 and the control panel 14 thereby to perform the displaying operations to display the various menus in the display 15 and to switch the display contents of the display 15 on the basis of input signals from the operating section 16, and the displaying operations to store the set information inputted from the operating section 16. Further controlled is the communications for program downloading operations (described later) to be performed with the maintenance computer 50. The drive control of the printer engine 12 is performed such that a built-in CPU 31 (described later) executes the firmware program.

The printer controller 11 is configured to include an ASIC 20 (Application Specific Integrated Circuit) as a custom LSI, a flash ROM 21 as a nonvolatile memory, a RAM 22, and a printer engine controller 23 (as will be called the "engine controller"). The flash ROM 21 is exemplified by an EPROM and, especially in this embodiment, by an EEPROM (Electronically Erasable and Programmable Read Only Memory) capable of erasing its memory electrically. Of course, the flash ROM 21 can also be exemplified by a UV-EPROM. The example of the custom LSI should not be limited to the ASIC but may also be exemplified by an FPGA or the like.

The flash ROM 21 is stored with various programs containing the firmware program, various data necessary for the printing operations, and so on. The RAM 22 is temporarily stored with program data to be executed by the CPU 31, the data obtained from the program by the CPU 31, and so on. The engine controller 23 is provided with various driver circuits to be used when the CPU 31 executes the firmware program to drive and control the printer engine 12, and drives and controls the various actuators constituting the printer engine 12 on the basis of control signals and control data inputted from the ASIC 20.

The ASIC 20 is constituted of one chip, in which the CPU (Central Processing Unit) 31, a mask ROM 32 as non-rewritable memory, a USB (Universal Serial Bus) interface 33 as a first communicator, a UART (Universal Asynchronous Receiver Transmitter) interface 34 as a second communicator, and an engine interface 35.

The USB interface 33 is provided with a USB printer controller and a USB connector 33a. On the other hand, the UART interface 34 is provided with a UART and a connector 34a. This connector 34a is exemplified by an RS-232C connector.

The UART, as packaged in the UART interface 34, is a communication circuit for converting a serial signal sent from the host computer 40, into a parallel signal and for transferring the parallel signal to the CPU 31, and for converting a parallel signal sent from the CPU 31 into a serial signal and for outputting the serial signal to the connector 34a. The UART functions as a controller for serial data communications, and uses a simple communication program language to perform a flow control and a shaping and correction of data. The UART has no logical protocol layer in a communication protocol to be used in the communications. Therefore, the UART performs the one-to-one communications with a party specified.

In the communications with the host computer 40, the USB connector 33a of the printer 10 and the body 41 of the host computer 40 are connected through a communication cable 18. In the communications with the maintenance computer 50, the connector 34a of the printer 10 and the connector 50a (e.g., the RS-232C connector) of the maintenance computer 50 are connected through a communication cable 19 (e.g., the RS-232C cable).

The host computer 40 is provided with the body 41, a display device 42, and a keyboard 43 and a mouse 44 as input devices. The body 41 has a reading device 45 built therein for reading the stored data of a CD-ROM 48. For example, a printer driver program or the like is stored in the CD-ROM 48, as supplied when the printer 10 is purchased, and is used by setting the CD-ROM 48 in the reading device 45 to install the printer driver program or the like in a hard disk. In this embodiment, the CD-ROM 48 is also stored with the various programs necessary for downloading operations, which are installed for use together with the printer driver program in the hard disk. Here, the maintenance computer 50 is used by the user and by the serviceman. In a case where the maintenance computer 50 is used by the user, the CD-ROM 48, as bundled with the printer 10, is stored with the program for the download at the maintenance time, so that the downloading program is installed together in the hard disk of the host computer 40. In a case where the maintenance computer 50 is used by the serviceman, on the other hand, a maintenance program is installed in a printer controller dedicated to the serviceman thereby to make the maintenance computer 50.

Here, a firmware program (described later) is stored in the flash ROM 21 or the nonvolatile memory. In the rewriting operation, therefore, a portion of the program may be easily either erased by an overwrite or left non-rewritten, and the firmware program may be broken. The printer 10 is stored with the communication program to be communicated with the host computer 40 so as to download the firmware program. This firmware program is updated, when troubled for the aforementioned reason or the like, by downloading it from the host computer 40. However, the USB communication program can be broken, because it is also stored in the flash ROM 21. In this case, according to this embodiment, the USB communication program and the firmware program are downloaded from the maintenance computer 50.

Here, both the host computer 40 and the maintenance computer 50 are personal computers (PC) having no special difference on the hardware and the software. The difference resides only at what terminal is connected with the printer 10 for the communications, because the download at the maintenance time is performed by using the UART interface 34 of the printer 10. Since the communications are performed by using the UART, the download at the maintenance time is naturally the communication protocol having no logical layer. Therefore, the various designating operations have to be done by the operator (e.g., the serviceman or the user). The maintenance computer 50 is provided with an RS-232C interface 51 as a serial port.

The UART in the UART interface 34 on the side of the printer 10 is so controlled by the CPU 31 as to convert the serial bit stream of update program data received by the serial communications from the transmission interface 51 (or the RS-232C interface) on the side of the maintenance computer 50, into a parallel bit stream, and transfers the parallel bit stream converted, to the CPU 31 through a bus 36. The UART and the RS-232C are identical in communication formats so that they can perform the serial communications directly. Here, the connectors 34a and 50a use the D-sub9 pin or the D-sub25 pin as the connector of the RS-232C communication type.

When the data transmission operations are performed from the maintenance computer 50, physical connections or physical layers are physically connected at first. Next, a UART connection request is issued from the maintenance computer 50, and the UART interface 34 responsively establishes the UART connection. Next, the logical connection is made. This logical connection is established such that the maintenance computer 50 requests the logical connection and such that the UART interface 34 of the printer 10 responds to the request. When this logical connection is established, the data transfer is started. The UART of the UART interface 34 on the side of the printer 10 transfers the data to the CPU 31. When the download is completed, the logical connection is broken, and the physical connection is then broken so that the communication link is cut off. The UART communication system and the RS-232C communication system corresponding to the one-to-one communications are fixed in the party. Therefore, the communication protocol has neither the procedure for recognizing the party nor the logical layer to perform the function of the kind adopted in the USB communication system corresponding to the one-to-many communications.

Figure 2:
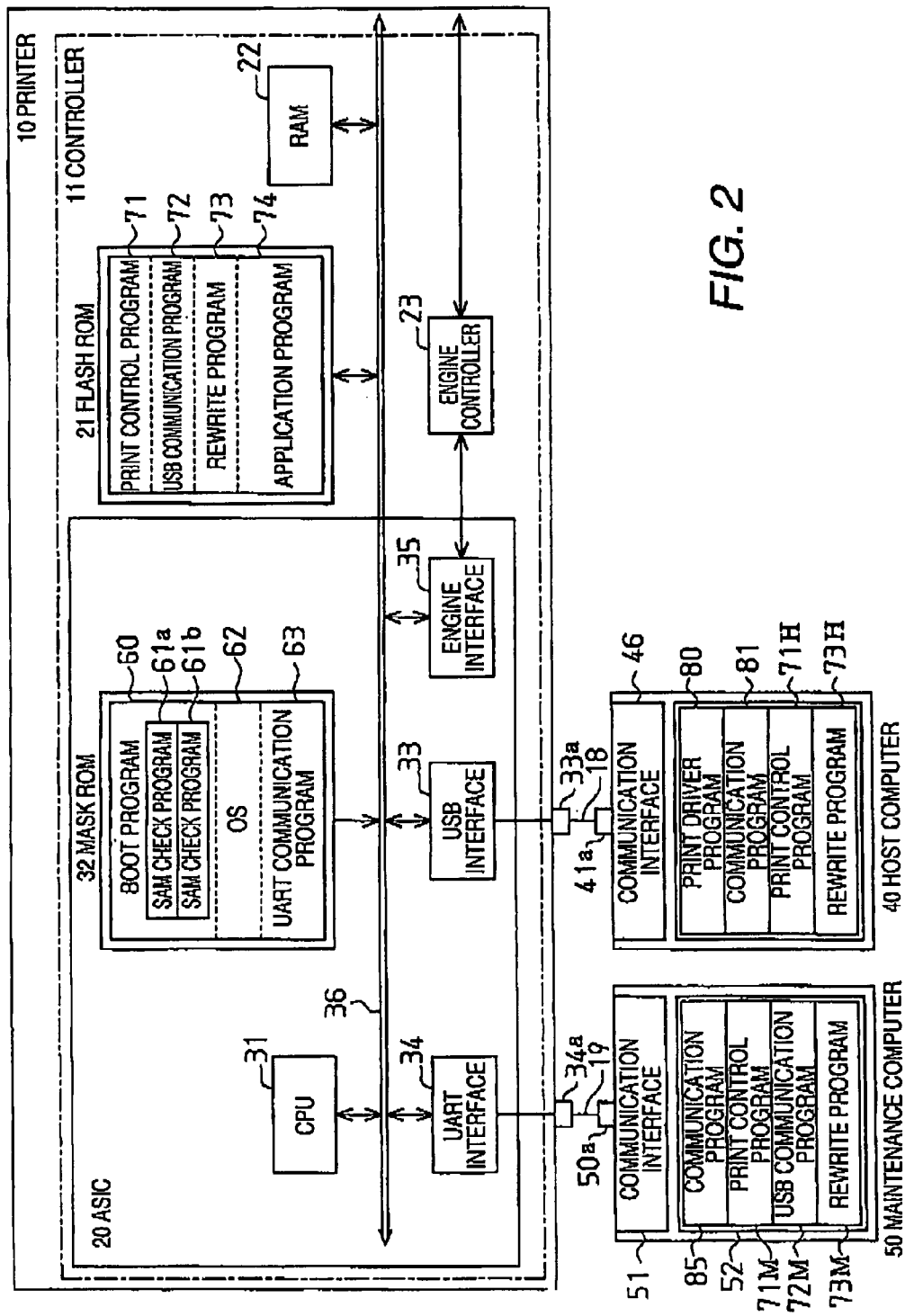
FIG. 2 is a block diagram showing an electric configuration related to a download processing performed in the printer.

FIG. 2 shows the programs which are stored in the mask ROM 32 and the flash ROM 21 on the side of the printer 10 and in the individual hard disks of the host computer 40 and the maintenance computer 50.

The mask ROM 32 is a boot ROM stored with a boot program. The mask ROM 32 is stored with the aforementioned boot program 60, an OS (Operating System) 62, a UART communication program 63 as a second communication program, a partial program necessary for the print controls, data and so on. Here, the non-rewritable memory can be exemplified not only by the mask ROM 32 but also by a PROM (Programmable Read Only Memory).

The boot program 60 contains not only a boot processing program such as a boot loader or an MBR (Master Boot Record) but also SAM check programs 61a and 61b prepared for deciding it by a program check (or inspection) whether or not the firmware program or the like is erroneous or abnormal.

The SAM check program 61a (or a first inspection program) is a program to be executed for a program check to decide it by the SAM check whether or not a plurality of portions or points of a print control program 71 (or a first download processing program) are erroneous. On the other hand, the SAM check program 61b (or a second inspection program) is a program to be executed for a program check to decide it by the SAM check whether or not a plurality of portions or points of a USB communication program 72 (or a second download processing program) are erroneous. The individual SAM check programs 61a and 61b execute not only the SAM checks but also confirmations of the header information, the version information and so on as check items on the program data to be checked. Here, the program checking method can adopt not only the SAM check but also other known program checking methods such as the parity check.

The UART communication program 63 corresponds to the one-to-one communications so that it does not have the aforementioned logical layer but has program data of relatively small quantity. Even if the UART communication program 63 of the small data capacity is added, it can be stored in the storage area of the mask ROM 32. It is, therefore, needless to change the mask ROM 32 into a precious one of a large storage capacity or to add another ROM. In a case where the mask ROM 32 intrinsically has a small space for the storage area, the storage capacity of the mask ROM 32 has to be increased, but the ASIC 20 to contain the mask ROM 32 need not be enlarged so much.

On the other hand, the flash ROM 21 is stored with the print control program 71 (or the firmware program), the USB communication program 72 for the USB communications with the host computer 40 so as to download the print control program 71, a rewrite program 73 for rewriting and updating the program into the downloaded update program, and an application program 74.

The USB communication program 72 is a download processing program, which is executed by performing the USB communications with the host computer 40 so that the various update programs containing the print control program are downloaded. In this embodiment, the USB communication standard or one of the serial communication standards is adopted so that the user can download by the relatively simple operation. The USB is the communication standard matching one-to-many multidrop connections, and has a communication protocol containing the logical layer borne by the software for the one-to-many connections.

Here, the logical layer indicates such a portion borne by the software of the USB communication unit as performs the procedures of plural kinds for the host computer 40 to recognize the device of the communication party. In the transfer methods of plural kinds prepared in the USB, e.g., in the control transfer, registers of several kinds called the "descriptors" are exchanged at the first time of connecting the host computer 40 and the device, and the host computer requests the information necessary for establishing the connections. In the USB, the pieces of information of at least seven kinds are needed as the values intrinsic to the device, and are returned to the host computer, so that the host computer can be recognized as the intrinsic device with those values. In this communication protocol matching the one-to-many connections, it is necessary to exchange the information necessary for establishing many connections. The logical layer is defined to indicate the software portion bearing the operation to satisfy the system request intrinsic to the standards matching the one-to-many connections.

The establishment of those logical connections contains the logical layer for exchanging many pieces of information so that the USB communication program 72 has a remarkably large program data quantity. In this embodiment, for example, the USB2.0 is adopted, and the High Speed mode is adopted at the later-described download communication time so that the transfer can be performed at a transfer rate as high as 480 Mbps. It is natural that the USB1.1 can also be adopted. On the other hand, the transfer rate may be lowered by using the LS (Low Speed) mode (1.5 Mbps) or the FS (Full Speed) (12 Mbps).

The rewrite program 73 is a program for erasing the old program from the flash ROM 21 and for writing the update program, as downloaded and deployed in the RAM 22, in a prescribed area of the flash ROM 21.

The not-shown operating system (OS) is installed in a hard disk (52) of the maintenance computer 50. A terminal emulator (or a terminal program) belongs to the operating system. This terminal emulator (e.g., the terminal emulator "xterm" (or "kterm") to act on the X Window System) can perform communications through the RS-232C. The serviceman starts the terminal emulator from the maintenance computer 50, and sends (downloads) the update program to the printer by inputting necessary commands and file names to perform the operations to select and send the files.

When the printer 10 is activated, the CPU 31 executes the booting operation, in which it executes the SAM check programs 61a and 61b. At first, the SAM check program 61a is executed to check (or inspect) the print control program 71. The print control program 71 is executed, if an abnormal condition is not found. If an abnormal condition is found, the SAM check program 61b is continuously executed to check (or inspect) the USB communication program 72 and the rewrite program 73. If no abnormal condition is found in the USB communication program 72 and the rewrite program 73, the aforementioned USB communication program 72 having no abnormal condition found is executed to download the print control program 71 from the host computer 40. If either the USB communication program 72 or the rewrite program 73 is abnormal, the print control program 71 cannot be downloaded and updated. In this case, the UART communication program 63 is executed to download a print control program 71M, a USB communication program 72M and rewrite program 73M from the maintenance computer 50.

Figure 3:
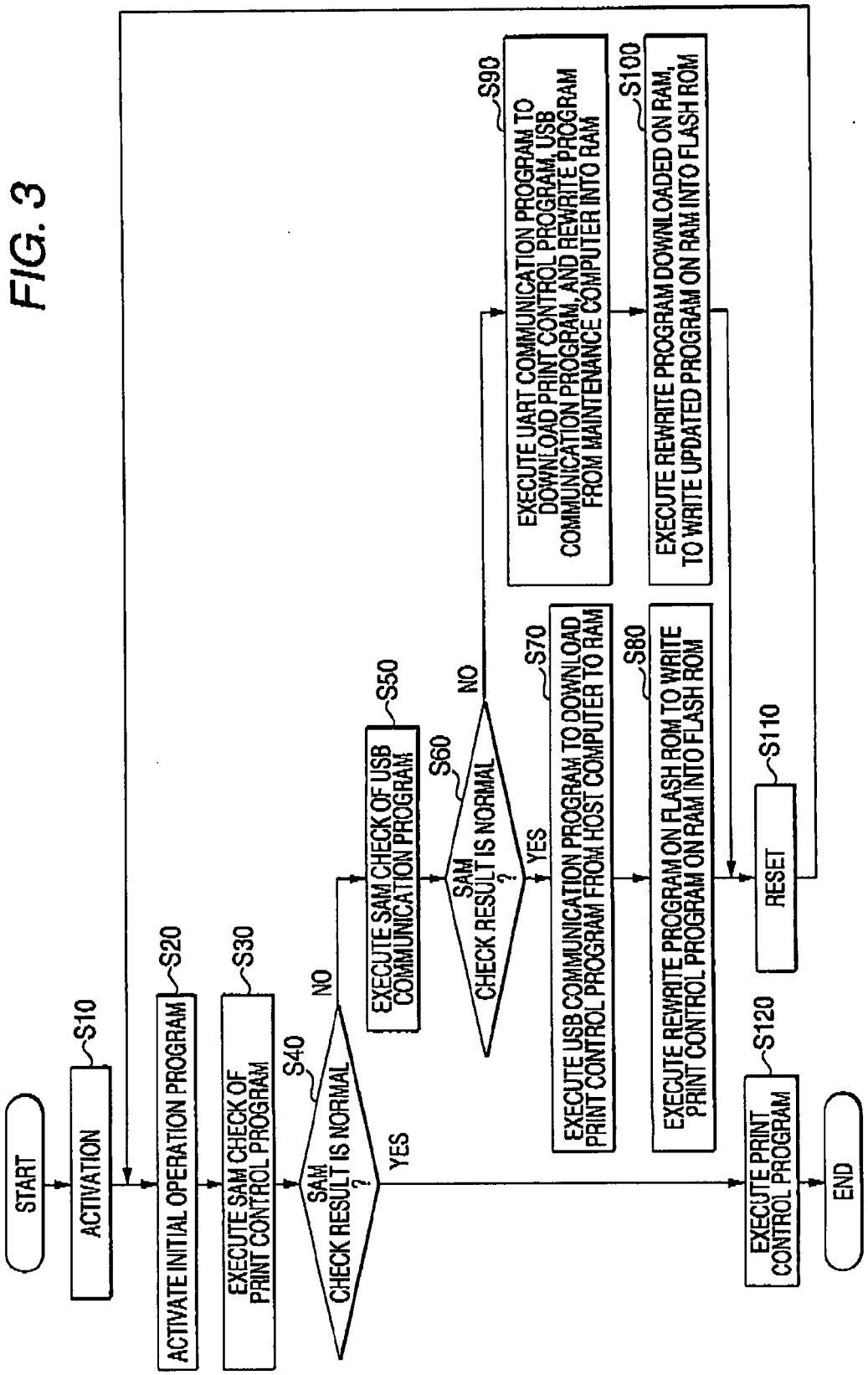
FIG. 3 is a flowchart showing a program executed by a CPU in the printer.

FIG. 3 is a flowchart showing a series of programs, which are executed by the CPU 31 so as to realize the operations thus far described. These operations of the CPU 31 are described in the following with reference to FIG. 3. Here, the flowchart partially contains the operations of the user.

The user operates the power switch of the operating section 16 of the printer 10 thereby to activate the printer 10 (at Step S10). Then, the CPU 31 starts the operations at and after Step S20.

At Step S20, an initial operation program is started. Specifically, a boot program is read from the ROM 32 (or the boot ROM), and is executed to start the OS 62. When the printer 10 is started, more specifically, the MBR (Master Boot Record), as placed at the head of the mask ROM 32, is read in so that the boot loader (or the program) acts. The boot loader reads the table having recorded the position and size of the are in the mask ROM 32, and reads the boot area to be started, with reference to the table. The program, as placed in the boot area, starts the OS 62 (or the operating system) placed in that area.

At Step S30, the SAM check of the print control program 71 is executed. Specifically, this is done by executing the SAM check program 61 read from the mask ROM 32. This SAM check is performed in the boot operation and at the activating time of the printer 10. Here, the header information and the version information are confirmed.

At Step S40, it is decided whether or not the SAM check is normal. If normal, the procedure advances to Step S120, at which the print control program 71 is executed. Otherwise, the procedure advances to Step S50.

At Step S50, the SAM check of the USB communication program 72 is executed. Here, the SAM check and so on of the rewrite program 73 are executed together. Here, the header information and the version information are confirmed.

At next Step S60, it is decided whether or not the SAM check is normal. The procedure advances to Step S70 if normal, but to Step S90 if not. In the abnormal case, a print control program 71H cannot be downloaded from the host computer 40 and updated. This is because the USB communications with the host computer 40 cannot be made if the USB communication program 72 is abnormal, and because the program data developed in the RAM 22 cannot be rewritten in the flash ROM 21 although the print control program 71H can be downloaded by the USB communications, if the rewrite program 73 is abnormal.

At Step S70, the USB communication program 72 on the flash ROM 21 is executed to download the print control program 71H from the host computer 40 to the RAM 22.

At Step S80, the rewrite program 73 on the flash ROM 21 is executed to write the print control program 71H on the RAM 22, in the flash ROM 21. Here, at Step S70, a rewrite program 73H may be downloaded together, and the print control program 71 may be rewritten in the flash ROM 21 by the rewrite program 73H downloaded.

At next Step S110, the printer 10 is reset. The procedure advances to Step S20. From now on, the operations similar to those at the activation time are done to perform the initialization program start (or the reboot) (of Step S20), the print control program SAM check (of Step S30) and the SAM check normal decision (of Step S40). If the print control program downloaded from the host computer 40 and updated is normal, the procedure advances to Step S120, at which the print control program 71 is executed.

In a case where the SAM check of Step S60 is decided to be not normal (or abnormal), the procedure advances to Step S90. When it is decided at Step S60 that the SAM check is not normal, it is displayed in the display 15 of the control panel 14 that the download by the maintenance computer 50 is necessary. The serviceman, as called by the user having seen that display, connects the connector 50a (or the RS-232C terminal) of the maintenance computer 50 and the printer 10 through the communication cable 19.

At Step S90, the UART communication program 63 is executed to download the print control program 71M, the USB communication program 72M and the rewrite program 73M from the maintenance computer 50 into the RAM 22. At this time, the maintenance computer 50 performs the input operation for the download. The serviceman activates the maintenance computer 50 to start the terminal emulator (or the terminal program) bundled with the OS. The serviceman inputs the command to select the file, and inputs the transmission command to perform the sending operation. When these operations are finished, the maintenance computer 50 executes a communication program 85 to start the downloading operation. The update program data is sent by the serial communications through the RS-232C. When the communication link is established in advance for the transmission of the update program data, the download of the update program data to the printer 10 is started. At this time, the communications of the logical layer needing the one-to-many connection correspondences are not performed for establishing the communication link.

At Step S100, the rewrite program 73M downloaded on the RAM 22 is executed to write the updated program (i.e., the print control program 71M and the USB communication program 72M) on the RAM 22, into the flash ROM 21. At Step S110, the procedure is reset and returned to Step S20. From now on, operations like those at the activation time are done to perform the individual operations of the initial operation program (or restart) (S20), the print control program SAM check (S30) and the SAM check decision (S40). If the print control program, as downloaded from the maintenance computer 50 and updated, is normal, the procedure advances to Step S120, at which the print control program 71 is executed.

Here, the CPU 31 for executing the SAM check operations of Steps S30 and S40 serves as a first inspector, and the CPU 31 for executing the SAM check operations of Steps S50 and S60 serves as a second inspector. Moreover, the CPU 31 for executing the downloading operations of Steps S70 and S80 serves as a first downloader, and the CPU 31 for executing the downloading operations of Steps S90 and S100 serves as a second downloader. Still moreover, the CPU 31 for executing the rewriting operation of Step S100 serves as a rewriter.

The following advantageous effects can be obtained according to the embodiment thus far described.

(1) In a case where the print control program 71 is checked and decided to be abnormal, the USB communication program 72 is further checked. If the USB communication program 72 is abnormal, the UART communication program 63 stored in the mask ROM 32 is executed to download the print control program 71M and the USB communication program 72M. Even in a case where the USB communication program 72 is abnormal, the print control program 71M can be downloaded to restore the printer 10.

(2) It is necessary to store a memory other than the flash ROM 21. Since the UART interface 34 having no logical layer is used, however, the data capacity of the UART communication program 63 can be reduced to make it unnecessary to enlarge the mask ROM 32 or to add another ROM. As a result, the UART communication program 63 can be stored, even if added, in the mask ROM 32 thereby to avoid an increase in the size of the ASIC 20. Moreover, the UART communication program 63 is stored in the mask ROM 32 so that it is hardly broken. As a result, the printer 10 is hardly made unrestorable, even if the downloading communication program is broken.

(3) The SAM check program 61b for checking the USB communication program 72 is incorporated as a part into the boot program 60, so that the abnormal program state can be discovered just after the power of the printer 10 was turned ON.

(4) In order to communicate with the USB interface and the RS-232C interface supplied with the personal computer, the USB communication program and the UART communication program are prepared. There are prepared the USB communication program 72, in which the communication program is made to match the USB communication protocol so that the communications may be made by a general communication interface, and the UART communication program 63 which is made to match the RS-232C. As a result, the print control program and so on can be downloaded by using the ordinary personal computer.

(5) In a case where the USB communication program 72 is abnormal, not only the print control program 71 but also USB communication program 72 is downloaded together. In a case where the print control program 71 is troubled again, therefore, the download can be made from the host computer 40.

(6) In a case where the abnormal state is discovered by the SAM check, the CPU 31 executes the USB communication program 72 so that the download is made substantially automatically without any operation of the user. When the communication cable is not connected, the user is informed by displaying the necessity for the download in the display 15 of the printer 10, so that the user can take the proper operation instantly.

Here, the configuration of the invention should not be limited to the aforementioned embodiment but may be modified in the following manner.

Figure 4A:
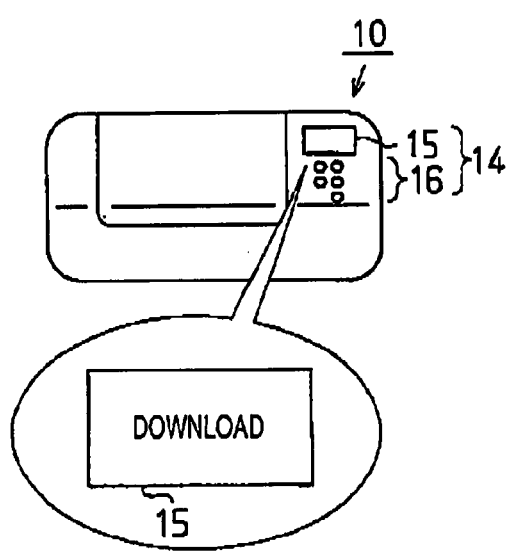
FIGS. 4A and 4B are schematic views showing a printer and a host computer according to a first modified example.
Figure 4B:
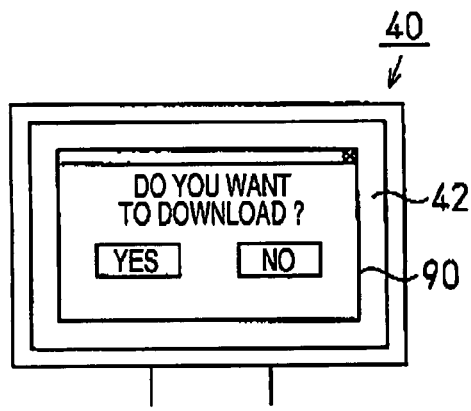

In the aforementioned embodiment, when the download is made from the host computer 40 by the USB communications, the print control program 71H is updated by the automatic download if connected with the host computer 40 through the communication cable 18. However, the configuration may be so modified that the decision of the execution of the download is made by the user. If the abnormal state of the print control program 71 is discovered, as shown in FIG. 4A, the "download" is displayed on its necessity in the display 15 of the control panel 14 of the printer 10. At the same time, a download confirmation screen 90 is displayed in the screen of the host computer 40, as shown in FIG. 4B, and the user operates the input device thereby to start the download.

In the aforementioned embodiment, the other device (or a first device) or the download source (or a communication mate) of the first downloader is the host computer, and the other device (or a second device) or the download source (or a communication party) of the second downloader is the maintenance computer. However, the assignments are not limited thereto. For example, the configuration may also be so modified that the host computer serves as the maintenance computer. If the host computer 40 is provided with a second communicator (e.g., a RS-232C interface capable of performing the UART communications), the maintenance computer 50 can also serve as the maintenance computer if the communication program 85 and the USB communication program 72M, as stored in the hard disk, are separately added.

Figure 5:
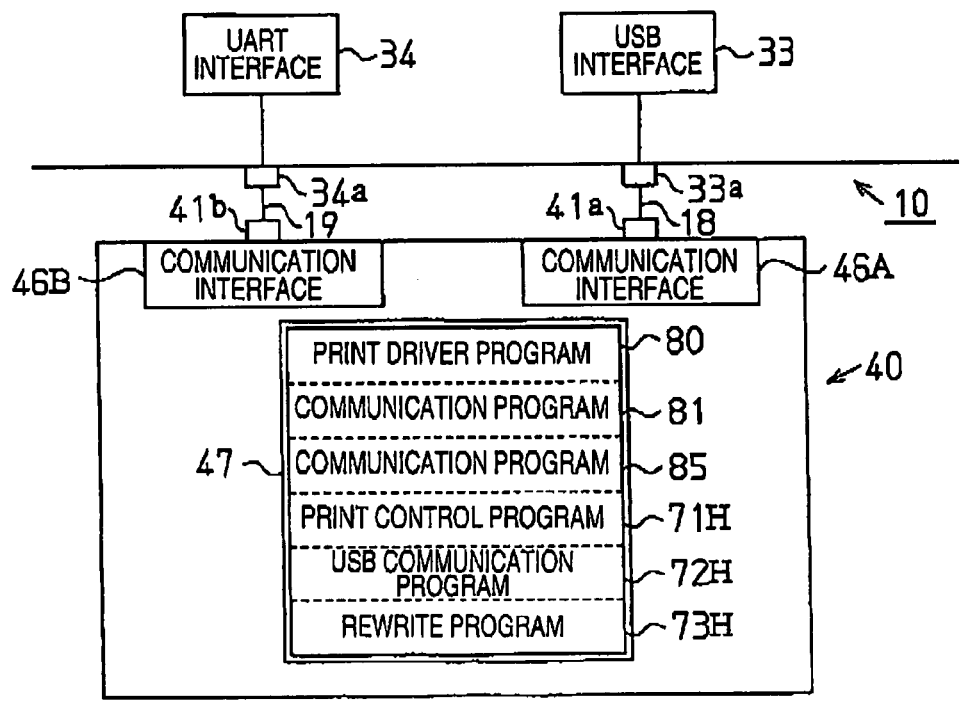
FIG. 5 is a block diagram showing a host computer according to a second modified example.

As shown in FIG. 5, specifically, the host computer 40 has its hard disk 47 stored with not only a print driver program 80 but also communication programs 81 and 85, the print control program 71H, a USB communication program 72H and the rewrite program 73H. When the connectors 33a and 41a are connected through the communication cable 18, it serves as the host computer 40. When the connectors 34a and 41b are connected through the communication cable 19, it serves as the maintenance computer. With the above configurations, in a case where an abnormal state is discovered in the print control program 71 and the USB communication program 72, the communication cable 19 is connected between the connectors 34a and 41b. When the input device is operated, the print control program 71H can be updated to restore the printer 10 instantly. It is, therefore, unnecessary to call the serviceman or to prepare the PC separately for the maintenance computer.

In the aforementioned embodiment, the first check program and the second check program are stored together as the SAM check program in the mask ROM 32 (or the boot ROM). However, the configuration may also be so modified that only one check program is stored in the mask ROM. For example, only the first check program for checking the firmware program may be stored in the mask ROM 32 so that it may be executed together with the boot program at the initial operation starting time. In this case, the check of the firmware program is done at the time of rising the electronic device. In the case of an abnormal state, the second check is either triggered by the operation of the user or independently started by executing the second check program, As a result, it is possible to avoid the drive of the printer engine 12 as the driving member while at least the firmware program being left abnormal.

In the aforementioned embodiment, the restart is automatically made, but the restart after the update program was downloaded may also be so made that the user operates the power switch. In this case, text information of "Please, activate again." may be displayed in the display 15 of the control panel 14. Alternatively, the aforementioned text information may also be displayed in the screen of the host computer 40.

In the aforementioned embodiment, the other device (or a first device) or the download source (or a communication party) of the first downloader is the host computer, and the other device (or a second device) or the download source (or a communication mate) of the second downloader is the maintenance computer. However, the configuration should not be limited thereto. The other device (or at least the first device or the second device) may be another electronic device (e.g., another printer). Independently of the other device to become the communication party of the download, the printer 10 can acquire the effects (e.g., the suppression of the large size of the mask ROM) of the aforementioned embodiment.

In the aforementioned embodiment, if the print control program 71 and the USB communication program 72 are abnormal, the UART program 63 is executed to download the print control program 71M and the communication program 72M. However, the communication program 72M may be downloaded by the UART communication program 63, and the print control program 71 may be updated not by the UART communication program 63 but by the updated communication program.

Here, the communication interface as the first communicator may adopt not only the USB interface 33 but also the IEEE 1334 interface or the RS422 serial interface as the interface (or the serial port) of another serial transfer type. Moreover, the communication interface should not be limited to the serial port such as the USB or the IEEE 1334 but may adopt the interface (or the parallel port) of the parallel transfer type, in which a plurality of signal lines are used to transfer the data of a plurality of bits simultaneously. For example, the parallel port can be exemplified by the IEEE 1284 or the SCSI (Small Computer System Interface). In the IEEE 1284 case, it is possible to use any standard of the Centronics interface mode, the nibble mode, the byte mode, the ECP (Extended Capabilities Port) mode, and the EPP (Extended Parallel Port). On the other hand, the connector can be exemplified by the connector type of the kind other than the USB connector and the D-sub (D Subminiature) connector, such as the Amphenol connector. Moreover, the connector should not be limited to the wired communication interface, but either the host communication interface or the maintenance communication interface can be exemplified by a radio communication interface. The radio communication interface can adopt an infrared communication interface according to the Bluetooth (registered trademark) or the IrDA (Infrared Data Association). In the Bluetooth case, the HCI (Host Controller Interface) is defined between the printer controller (e.g., the base band or RF) and the host (or the host CPU). This HCI may be utilized because it serves as the communication interface corresponding to the UART. In this case, the UART is not needed in the ASIC 20.

The control program is not limited to the print control program. Specifically, the control program is not limited to the drive control program for controlling the drive of the driving member such as the printer engine including the motor or the recording head. The control program (or the firmware) may also be a program for realizing a prescribed function such as the display. In the printer 10 as the electronic device, for example, the display control program, as stored in the nonvolatile memory (or the flash ROM 21) for performing the displaying operation (or the display control) of the display 15 of the control panel 14, may be enumerated as a firmware other than the drive control program.

In the aforementioned embodiment, the electronic device is embodied into the ink jet type printer 10 as a liquid ejecting device. However, the electronic device should not be limited thereto but can also be embodied into a liquid ejecting device for ejecting a liquid (including a liquid medium having particles of a functional material dispersed therein) other than ink. The liquid ejecting device may be a liquid ejecting device for ejecting a liquid medium containing a material such as an electrode material or a coloring material to be used in the manufacture of a liquid crystal display, an EL (electronic luminescence) display and a surface emitting display, a liquid ejecting device for ejecting a biological organic substance to be used in a bio-chip manufacture, or a liquid ejecting device used as a precise pipette for ejecting a liquid to become a sample. Moreover, the invention may also be applied to the liquid ejecting device of any of those kinds. Moreover, the invention can be applied not only to the liquid ejecting device but also widely to another electronic device such as a laser printer, a scanner, a projector or a digital camera.

In the aforementioned embodiment, the UART communication program 73 is stored in the mask ROM 32. However, the UART communication program 63 may also be stored In a rewritable memory so that its stored area may not be a rewritten object. The rewritable memory for storing the UART communication program 63 may be identical to or different from the memory for storing the control program.

The disclosure of Japanese Patent Application No. 2005-303415 filed Oct. 18, 2005 including specification, drawings and claims is incorporated herein by reference in its entirety.

The invention claimed is:

1. An electronic apparatus, comprising:
   a first communicator performing communications with an external host computer;
   a second communicator performing communications with an external maintenance computer;
   a rewritable flash ROM storing a control program that controls an operation of the electronic apparatus, and a first communication program;
   an unrewritable mask ROM storing a boot program, a second communication program, a first inspector that judges whether the control program is normal, and a second inspector operable to judge whether the first communication program is normal;
   a first downloader downloading a replacement control program from the external host computer by way of the first communicator under the control of the first communication program, in a case where the first inspector judges the control program is not normal and the second inspector judges the first communication program is normal; and
   a second downloader downloading a replacement first communication program from the external maintenance computer by way of the second communicator under the control of the second communication program, in a case where the second inspector judges the first communication program is not normal, so that the first communication program stored in the rewritable flash ROM is rewritten with the replacement first communication program downloaded by the second downloader.

\* \* \* \* \*